US009678473B2

(12) United States Patent
Rosen et al.

(10) Patent No.: US 9,678,473 B2
(45) Date of Patent: Jun. 13, 2017

(54) APPARATUS FOR PRODUCING A HOLOGRAM

(71) Applicant: CELLOPTIC, INC., Rockville, MD (US)

(72) Inventors: Joseph Rosen, Omer, IL (US); Gary Brooker, Rockville, MD (US); Nisan Siegel, Silver Spring, MD (US)

(73) Assignee: CELLOPTIC, INC., Rockville, MD (US)

( * ) Notice: Subject to any disclaimer, the term of this patent is extended or adjusted under 35 U.S.C. 154(b) by 0 days.

(21) Appl. No.: 14/363,380

(22) PCT Filed: Dec. 7, 2012

(86) PCT No.: PCT/US2012/068486
§ 371 (c)(1),
(2) Date: Jun. 6, 2014

(87) PCT Pub. No.: WO2013/086350
PCT Pub. Date: Jun. 13, 2013

(65) Prior Publication Data
US 2014/0320942 A1    Oct. 30, 2014

Related U.S. Application Data

(60) Provisional application No. 61/567,930, filed on Dec. 7, 2011.

(51) Int. Cl.
*G03H 1/00* (2006.01)
*G03H 1/04* (2006.01)
(Continued)

(52) U.S. Cl.
CPC ............ *G03H 1/0005* (2013.01); *G03H 1/041* (2013.01); *G03H 1/0443* (2013.01); *G03H 1/06* (2013.01);
(Continued)

(58) Field of Classification Search
CPC ...... G03H 1/0005; G03H 1/04; G03H 1/0406; G03H 1/041; G03H 1/06; G03H 1/08;
(Continued)

(56) References Cited

U.S. PATENT DOCUMENTS 5,223,971 A * 6/1993 Magel .......................... 359/295
5,717,519 A * 2/1998 Sugiyama et al. ........... 359/368
(Continued)

FOREIGN PATENT DOCUMENTS

WO          00 29909        5/2000
WO    WO 2010/113123 A1   10/2010

OTHER PUBLICATIONS

Brooker, G. et al., "Optimal resolution in Fresnel incoherent correlation holographic fluorescence microscopy" Optics Express, vol. 19, No. 6, pp. 5047-5062, Mar. 14, 2011.
(Continued)

*Primary Examiner* — Scott J Sugarman
*Assistant Examiner* — Ibrahima Diedhiou
(74) *Attorney, Agent, or Firm* — Nixon & Vanderhye, P.C.

(57) ABSTRACT

An apparatus for producing a hologram includes a collimation lens configured to receive incoherent light emitted from an object; a spatial light modulator (SLM) that includes at least one diffractive lens which is configured to receive the incoherent light from the collimation lens and split the incoherent light into two beams that interfere with each other; and a camera configured to record the interference pattern of the two beams to create a hologram, wherein a ratio between a distance from the SLM to the camera and a focal length of the diffractive lens is greater than 1.

13 Claims, 12 Drawing Sheets

(51) Int. Cl.
*G03H 1/06* (2006.01)
*G03H 1/02* (2006.01)

(52) U.S. Cl.
CPC ............... *G03H 2001/005* (2013.01); *G03H 2001/0224* (2013.01); *G03H 2001/0447* (2013.01); *G03H 2223/23* (2013.01)

(58) Field of Classification Search
CPC ............... G03H 1/16; G03H 1/2294; G03H 2001/0413; G03H 1/0443; G03H 2001/0447; G03H 2001/0452; G03H 2001/005; G03H 2001/0454; G03H 2001/0224
USPC ...... 359/11, 30–31, 29, 1, 25, 368; 356/457; 378/36
See application file for complete search history.

(56) References Cited

U.S. PATENT DOCUMENTS

| | | | | |
|---|---|---|---|---|
| 5,796,500 | A * | 8/1998 | Hart | 359/24 |
| 7,848,595 | B2 | 12/2010 | Ayres et al. | |
| 2006/0066942 | A1 * | 3/2006 | Kouno et al. | 359/368 |
| 2006/0109563 | A1 * | 5/2006 | Dietrich | 359/663 |
| 2006/0192972 | A1 * | 8/2006 | Bingham et al. | 356/458 |
| 2008/0198432 | A1 * | 8/2008 | Tanaka et al. | 359/32 |
| 2008/0204833 | A1 * | 8/2008 | Rosen | 359/9 |
| 2009/0296205 | A1 | 12/2009 | Ouchi | |
| 2010/0060962 | A1 * | 3/2010 | Rosen | 359/29 |
| 2010/0142014 | A1 | 6/2010 | Rosen et al. | |
| 2010/0265516 | A1 | 10/2010 | De Groot et al. | |
| 2012/0050832 | A1 | 3/2012 | Rosen et al. | |
| 2012/0281197 | A1 * | 11/2012 | Tharaldsen | G01N 21/95623 355/71 |
| 2013/0335796 | A1 | 12/2013 | Rosen et al. | |

OTHER PUBLICATIONS

International Search Report Issued Feb. 15, 2013 in PCT/US12/068486 Filed Dec. 7, 2012.
Partial Supplementary European Search Report issued Jul. 20, 2015 in Patent Application No. 12855386.4.
Petr Bouchal, et al., "Point spread function and two-point resolution in Fresnel incoherent correlation holography" Optics Express, vol. 19, No. 16, XP055198908, Aug. 1, 2011, pp. 15603-15620.
Extended European Search Report issued Nov. 6, 2015 in Patent Application No. 12855386.4.
Supplementary European Search Report issued Nov. 24, 2015 in Patent Application No. 12855386.4.

* cited by examiner

APPARATUS FOR PRODUCING A HOLOGRAM

CROSS-REFERENCE TO RELATED APPLICATIONS

This application is related to and claims the benefit of priority to U.S. Provisional Application Ser. No. 61/567,930, filed Dec. 7, 2011, the contents of which are hereby incorporated herein by reference.

GOVERNMENT RIGHTS

This invention was made with U.S. government support under grant 60NANB10D008 awarded by the National Institute of Standards and Technology (NIST). The U.S. government has certain rights in the invention.

BACKGROUND

1. Field

The present specification relates to Fresnel Incoherent Correlation Holography (FINCH).

2. Description of the Related Art

Digital coherent holography has unique advantages for many imaging applications. In some applications the recorded holograms contain three dimensional (3D) information of the observed scene, in others the holograms are capable of imaging phase objects. Holography also enables implementing super resolution techniques and even makes it possible to image objects covered by a scattering medium. Because of these advantages, digital holography has become important in optical microscopy. Examples of utilizing digital holography as the basis for optical microscopes are the recently published studies of lensless compact holography-based microscopes (T.-W. Su, S. O. Isikman, W. Bishara, D. Tseng, A. Erlinger, and A. Ozcan, "Multi-angle lensless digital holography for depth resolved imaging on a chip," Opt. Express 18, 9690-9711 (2010); M. Lee, O. Yaglidere, and A. Ozcan, "Field-portable reflection and transmission microscopy based on lensless holography," Biomed. Opt. Express 2, 2721-2730 (2011); O. Mudanyali, W. Bishara, and A. Ozcan, "Lensfree super-resolution holographic microscopy using wetting films on a chip," Opt. Express 19, 17378-17389 (2011)). Another example of using digital holography in microscopy is the holographic coherent anti-Stokes Raman microscope. In the present study we extend our investigation of Fresnel Incoherent Correlation Holography (FINCH), a way to utilize holography with incoherent light, and which is another example of using digital holography in microscopy.

The setup of FINCH includes a collimation lens (objective in case of a microscope), a spatial light modulator (SLM) and a digital camera (CCD or CMOS). The principle of operation is that incoherent light emitted from each point in the object being imaged is split by a diffractive element displayed on the SLM into two beams that interfere with each other. The camera records the entire interference pattern of all the beam pairs emitted from every object point, creating a hologram. Typically three holograms, each with a different phase constant in the pattern of the diffractive element, are recoded sequentially and are superposed in order to eliminate the unnecessary parts (the bias and the twin image) from the reconstructed scene. The resulting complex-valued Fresnel hologram of the 3D scene is then reconstructed on the computer screen by the standard Fresnel back propagation algorithm (see J. W. Goodman, Introduction to Fourier optics, 3rd Ed., (Roberts and Company Publishers, 2005)). Unlike other techniques of incoherent digital holography, like scanning holography, or multiple view projection holography, FINCH is a non-scanning and motionless method of capturing holograms. Acquiring only three holograms is enough to reconstruct the entire 3D observed scene such that at every depth along the z-axis every object is in focus in its image plane. FINCH is a method of incoherent holography that can operate with a wide variety of light sources besides laser light. Because of this flexibility to practice high resolution holography with FINCH, it can be used to implement holographic applications which could not be realized in the past because they were limited by the need for coherent laser-light. Applicants have recognized additional properties of FINCH relating to resolution.

Recently two other research groups reported studies about FINCH. In one publication (Y. Tone, K. Nitta, O. Matoba, and Y. Awatsuji, "Analysis of reconstruction characteristics in fluorescence digital holography," in Digital Holography and Three-Dimensional Imaging, OSA Techinal Digest (CD) (Optical Society of America, 2011), paper DTuC13), the authors investigated the influence of the degree of spatial coherence of light on the quality of the reconstructed 3D profiles in FINCH. In the other publication (P. Bouchal, J. Kapitan, R. Chmelik, and Z. Bouchal, "Point spread function and two-point resolution in Fresnel incoherent correlation holography," Opt. Express 19, 15603-15620 (2011)), the authors proposed the conditions for optimal resolution with FINCH. They concluded that resolution in FINCH imaging cannot exceed that of a classical imaging system.

In this specification, the Applicants have come to different conclusions and show that indeed, FINCH imaging can exceed standard optical imaging system resolution. In the present specification, Applicants bring a more complete analysis of FINCH as an imaging system. Particularly, this specification addresses the question of which of the systems, FINCH or a conventional glass-lens-based imaging system, can resolve better. There is not an obvious answer to this question because FINCH has unique properties that do not exist in conventional optical imaging systems; on one hand, the FINCH hologram is recorded by incoherent illumination, but on the other hand this hologram is reconstructed by the Fresnel back-propagation process, exactly as is done with a typical coherent Fresnel hologram. So the question is whether FINCH behaves like a coherent or incoherent system, or whether it has its own unique behavior. Knowing that the difference between coherent and incoherent imaging systems is expressed, among others, by their different modulation transfer function (MTF), the more specific question is what kind of MTF characterizes FINCH. Does FINCH have an MTF of a coherent or incoherent imaging system, or does it have its own typical MTF? The answer to this last question can determine the answer to the resolution question. This specification analyzes the transverse resolution of FINCH and show here, both theoretically and experimentally, that FINCH imaging significantly exceeds the resolution of a conventional microscope optical imaging system.

BRIEF SUMMARY

In one embodiment, an apparatus for producing a hologram includes a collimation lens configured to receive incoherent light emitted from an object; a spatial light modulator (SLM) that includes at least one diffractive lens which is configured to receive the incoherent light from the collimation lens and split the incoherent light into two beams that interfere with each other; and a camera configured to record the interference pattern of the two beams to create a hologram, wherein a ratio between a distance from the SLM to the camera and a focal length of the diffractive lens is greater than 1.

In another embodiment, a system configured to examine a sample by both regular microscopy and Fresnel Incoherent Correlation Holography (FINCH) includes a mirror slider configured to position a mirror into a path of light emitted from an object when the system is set to perform regular microscopy, and to remove the mirror from the path when the system is set for FINCH; a beam splitter configured to receive the light emitted from the object and reflected off the mirror when the system is set to perform regular microscopy; an imaging camera configured to record an image formed at the system output; a reflective spatial light modulator (SLM) configured to receive the light emitted from the object when the system is set for FINCH, and to split the light into two beams that interfere with each other; and a holography camera configured to record the interference pattern of the interfering light beams to create a hologram.

In yet another embodiment, an apparatus for producing a hologram includes a tube lens configured to receive the light emitted from an object; a first mirror; a second mirror; a beam splitting cube configured to receive light emitted from the tube lens and to split the light in two directions towards the first mirror and the second mirror; a first lens positioned in the pathway between the beam splitting cube and the first mirror; a second lens position in the pathway between the beam splitting cube and the second mirror; and a hologram plane configured to receive light emitted from the beam splitting cube after it is reflected off the first mirror and the second mirror to produce a hologram.

Imaging of the sample using the SLM as a tube lens was possible by moving the input polarizer to the open position and displaying a diffractive lens pattern with a focal length equivalent to the distance between the SLM and camera. Reversing the position of the two sliders shown in the schematic allowed direction of the fluorescent emission to pass through a standard microscope NIKON tube lens to the monocular viewing port and associated imaging camera for conventional fluorescence microscopy.

Figure 5:
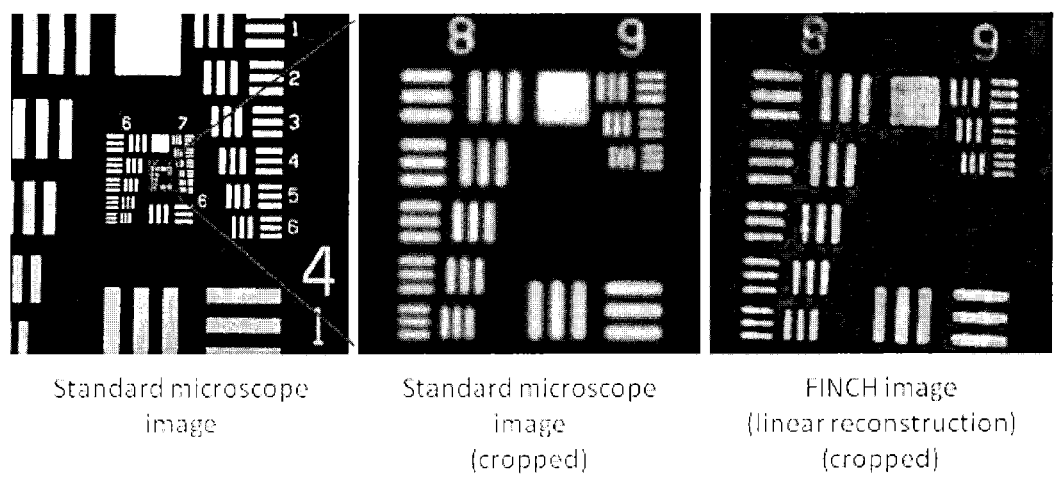

FIG. 5 shows representative full field USAF slide images captured in standard microscope operating mode (left panel). The middle panel of FIG. 5 shows zoomed-in group 8 and 9 features from full field standard microscope image. The right panel of FIG. 5 shows digitally linear reconstructed FINCH image of the small central pattern shown in the middle image, slightly cropped to match the middle image. All images were taken with a 5 mm aperture placed at the back plane of the objective.

Figure 6:
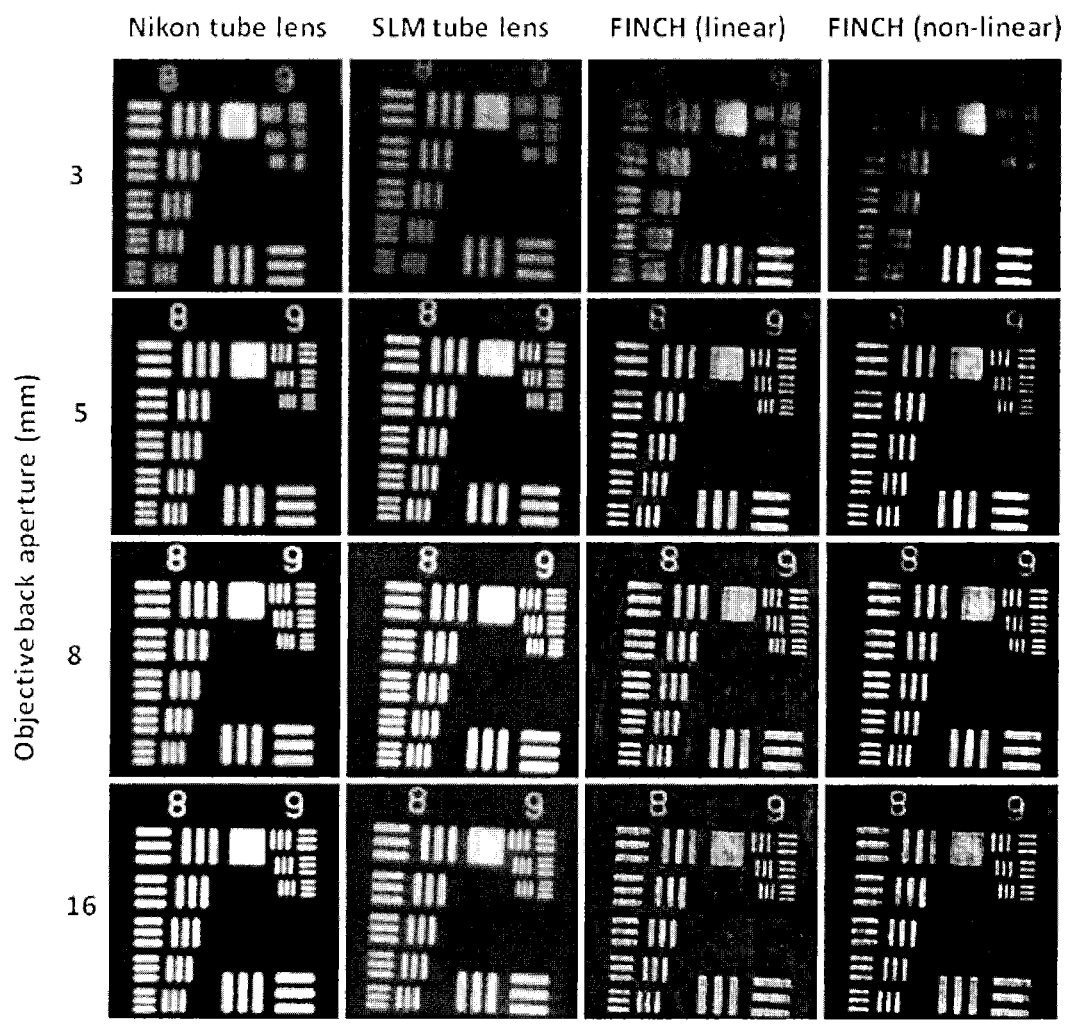

FIG. 6 shows cropped sections of images taken with: standard Nikon tube lens configured for standard fluorescence microscopy (first column); with the SLM acting as a tube lens (second column); and with either the linear and non-linear reconstruction of FINCH holograms. The FINCH images were recorded with a z-ratio of 1.8. Images with the SLM as the tube lens or with the FINCH method were taken at a SLM-camera distance of 1380 mm. The four sets of images were taken with varying apertures in the back plane of the objective as indicated on each row.

Figure 7:
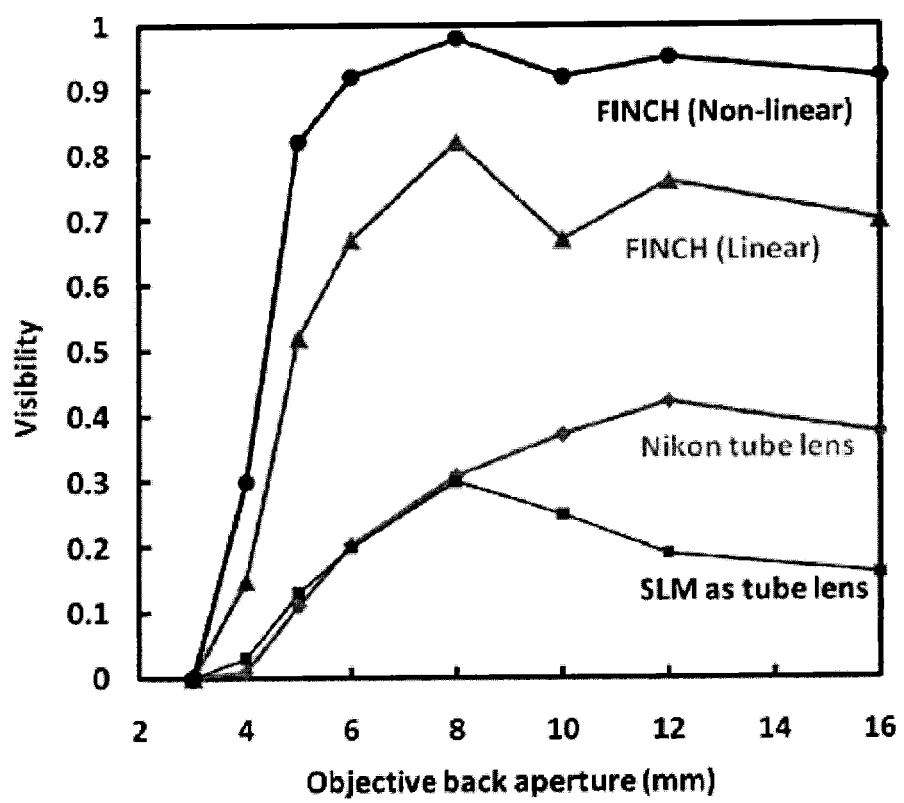

FIG. 7 shows that the visibility of the three smallest features of the USAF test pattern in three imaging modes as a function of the size of the aperture placed on the back plane of the objective. Data with the Nikon tube lens was taken with the lens and camera configured for standard fluorescence microscopy. Data for the SLM as the tube lens or with the FINCH method (z-ratio 1.8) were taken at a SLM-camera distance of 1380 mm. Data for the FINCH images are shown for both linear and non-linear reconstructions.

Figure 8:
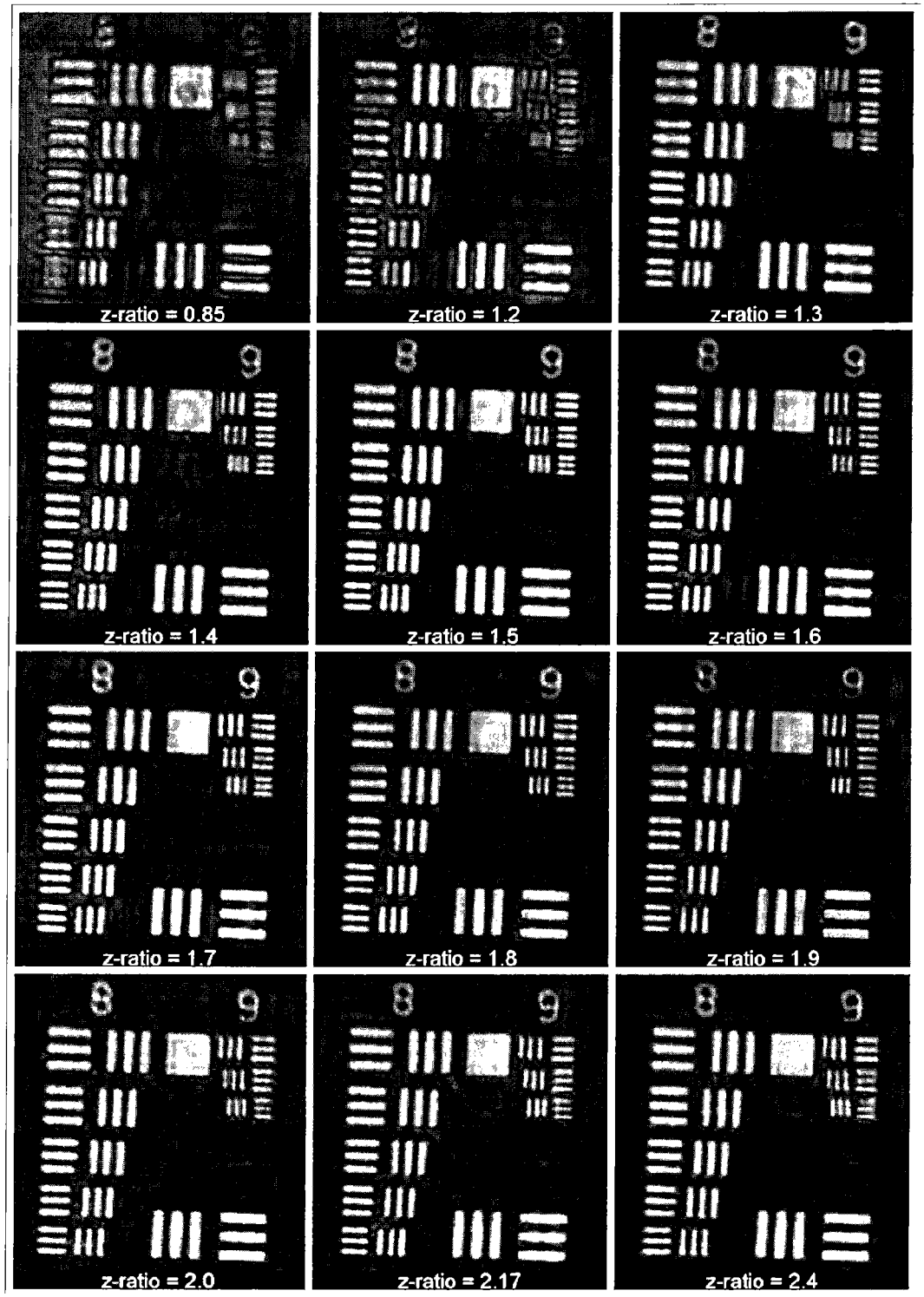

FIG. 8 shows linear reconstructions of FINCH images taken at varying z-ratios. At low z-ratio below 1, the SLM is focusing behind the camera while at high z-ratio above 1, it is focusing in front of the camera. Images were taken with a 5 mm aperture at the back plane of the objective, with a $z_h$ of 1380 mm.

Figure 9:
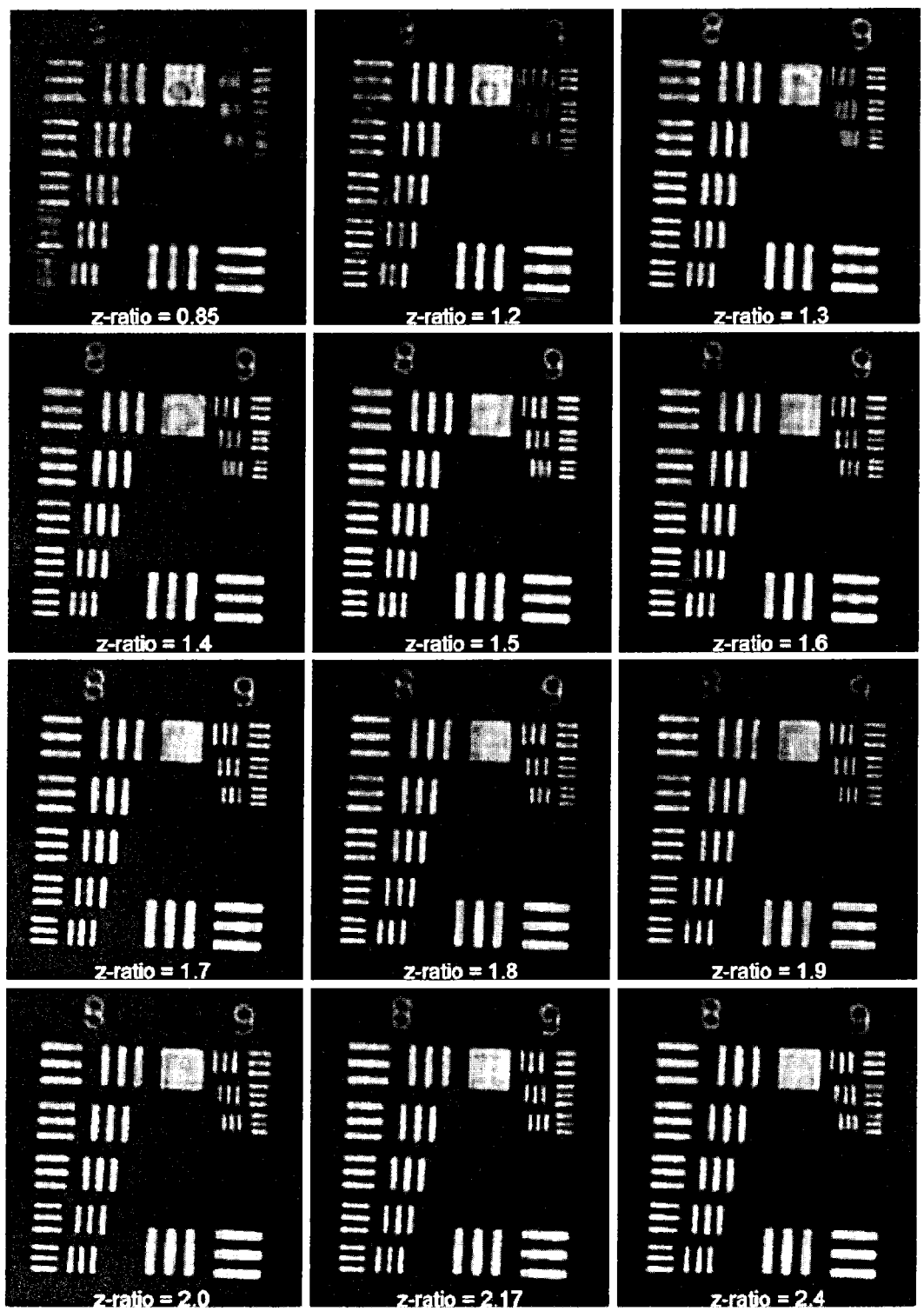

FIG. 9 shows non-linear reconstructions of FINCH images taken at varying z-ratios. At low z-ratio below 1, the SLM is focusing behind the camera while at high z-ratio above 1, it is focusing in front of the camera. Images were taken with a 5 mm aperture at the back plane of the objective, with a $z_h$ of 1380 mm.

Figure 10:
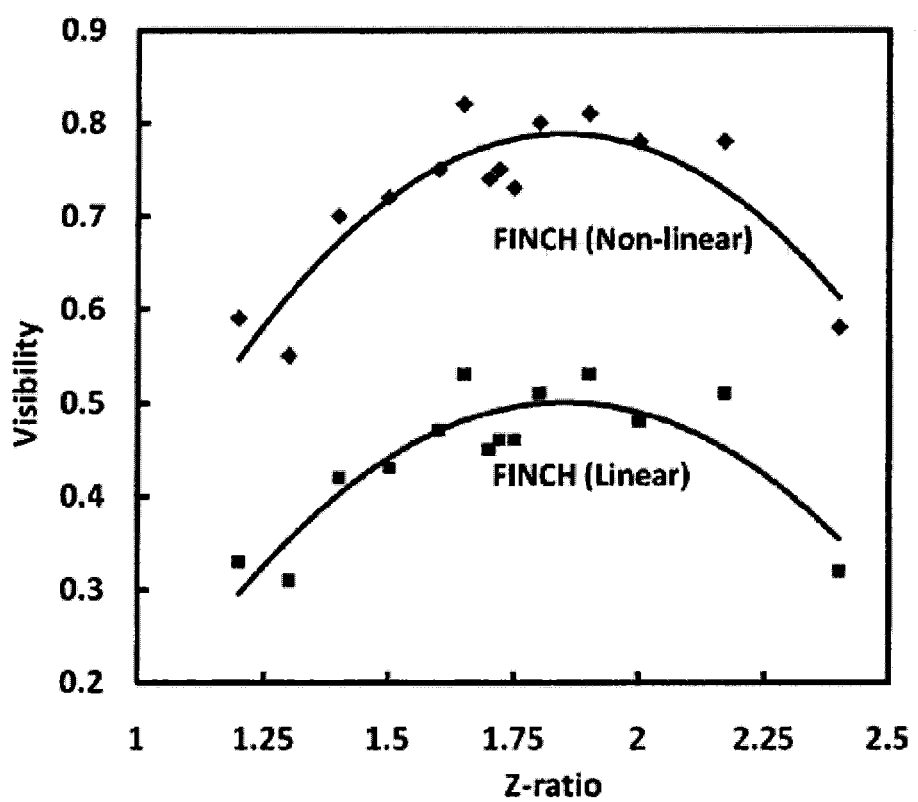

FIG. 10 shows plots of the visibility of the three smallest USAF features in FINCH as a function of the z-ratio, taken with a 5 mm aperture in the back plane of the objective. Data for both linear and non-linear reconstructions are shown. These data were taken with a $z_h$ of 1380 mm. For comparison, the visibility in standard microscopy is approximately 0.1 when the aperture is 5 mm (see FIG. 7). The lines are a polynomial fit of the data. For FINCH Non-linear, $y=-0.5769x^2+2.1313x-1.1801 R^2=0.8074$ and for FINCH Linear, $y=-0.4848x^2+1.7946x-1.1604 R^2=0.7866$.

Figure 11:
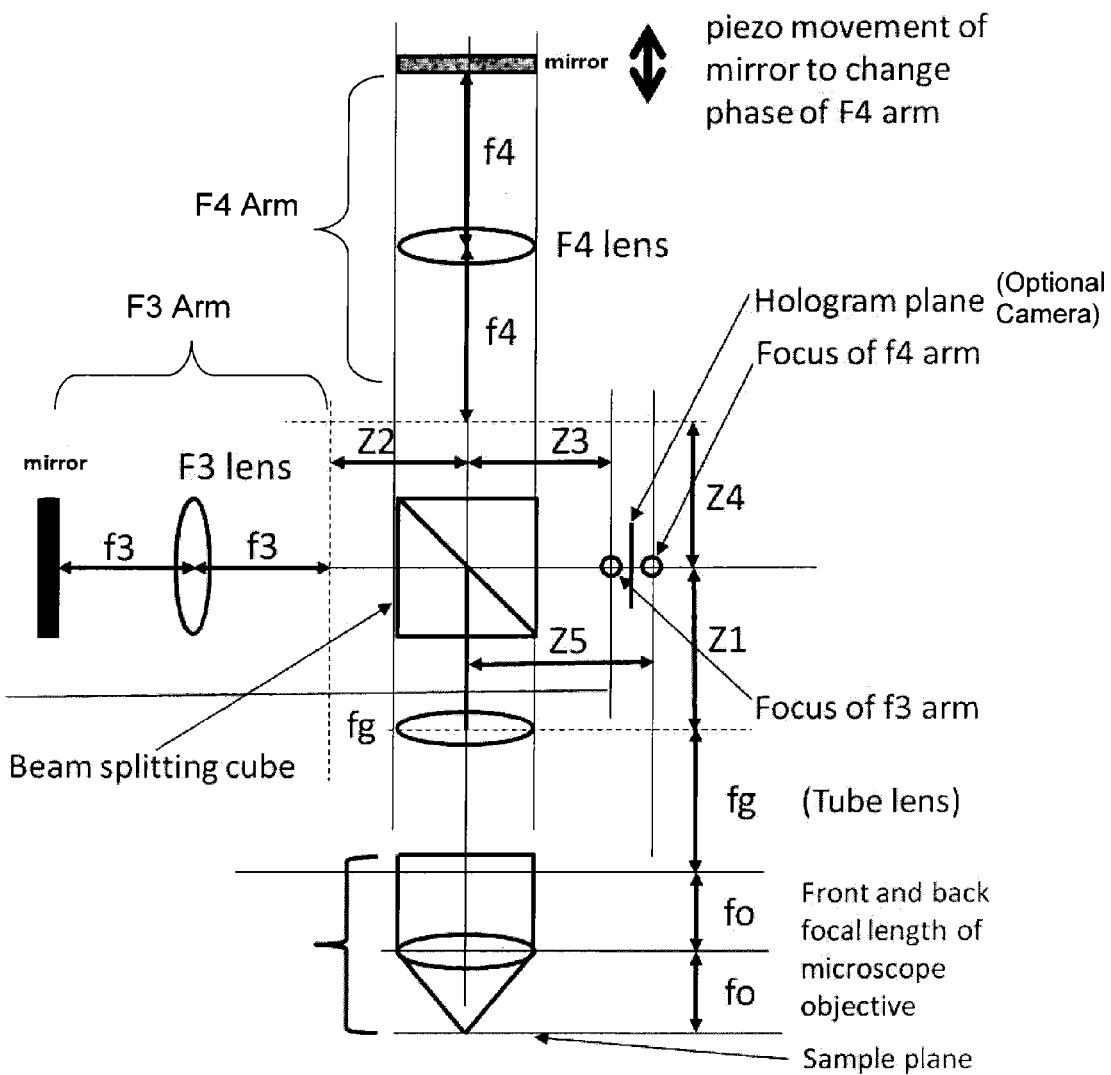

FIG. 11 shows another configuration to obtain perfect overlap between reference and sample beams that yields high holographic efficiency. In this configuration the F3 and F4 lenses were configured in a "4f" configuration with the respective mirrors creating two respective "4f" lens systems with lenses of focal lengths f3 and f4. The optical paths were adjusted so that the optical paths were identical for the F3 and F4 arm at the hologram plane to create complete overlap of the two spherical waves created by the F3 and F4 arm and perfect and efficient holograms of the objects imaged by the microscope objective at the sample plane.

Figure 12:
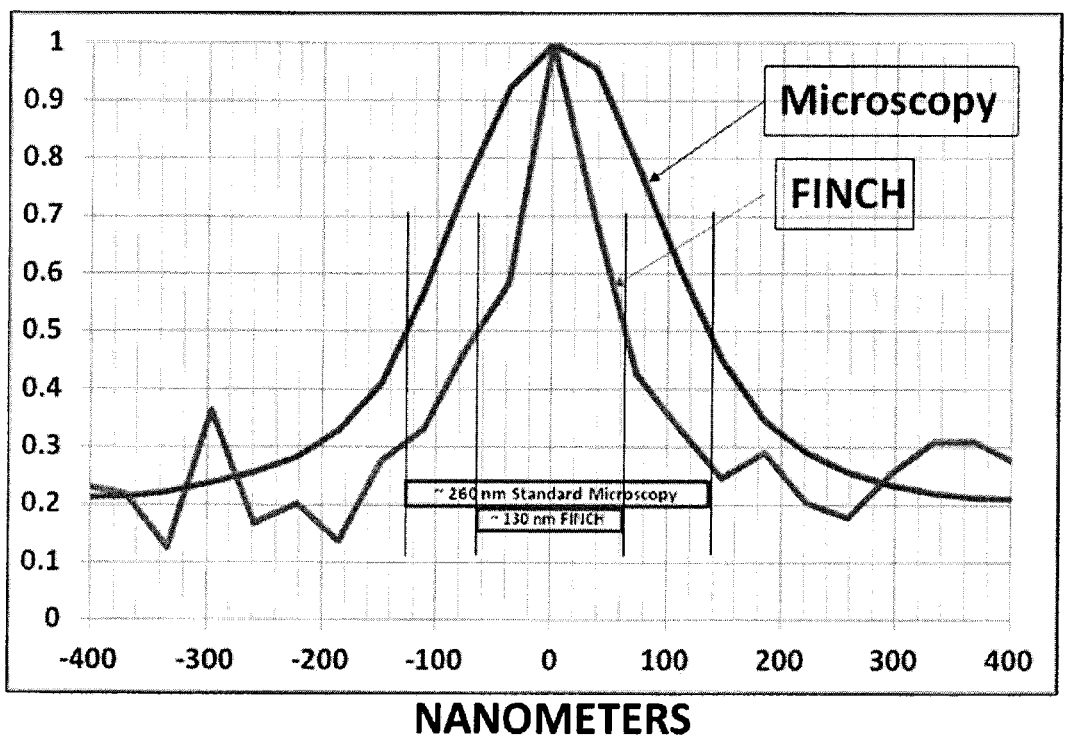

FIG. 12 shows the results of a FINCH experiment to resolve fluorescent beads beyond conventional microscope optical limits. The FWHM (full width half max) of 100 nm Tetraspec beads was measured by conventional fluorescence microscopy and "FINCH" with a 100×1.4 NA objective at X=590 nm. The Abbe criteria (0.5λ/NA)=optical resolution limit (0.5×590 nm/1.4=211 nm) but FINCH resolves better than the Abbe limit wherein a 100 nm bead measured with FINCH had a FWHM of 130 nm under these conditions.

DETAILED DESCRIPTION

FINCH, in the present model, creates holograms in a single channel system as a result of interference between two waves originating from every object point located in front of a collimating lens. The following analysis refers to the system scheme shown in FIG. 1(a), where it is assumed that the object is an infinitesimal point and therefore the result of this analysis is considered as a point spread function (PSF). For simplicity, we assume that the object point is located at $\bar{r}_s=(x_s,y_s)$ on the front focal plane of the collimating lens $L_1$ (an objective lens in the case of an infinity corrected microscope system). For an infinitesimal object point with the complex amplitude $\sqrt{I_s}$, the intensity of the recorded hologram is, $$I_H(u,v) = \left| \begin{array}{c} \sqrt{I_s}\, C(\bar{r}_s) L\!\left(\dfrac{-\bar{r}_s}{f_o}\right) Q\!\left(\dfrac{1}{f_o}\right) Q\!\left(\dfrac{-1}{f_o}\right) * Q\!\left(\dfrac{1}{d}\right) \\ \left[ B + B' \exp(i\theta) Q\!\left(\dfrac{-1}{f_d}\right) \right] * Q\!\left(\dfrac{1}{z_h}\right) P(R_H) \end{array} \right|^2. \quad (1)$$

where $f_o$ is the focal length of lens $L_1$, d is the distance between the lens $L_1$ and the SLM, $z_h$ is the distance between the SLM and the camera, $\bar{\sigma}=(u,v)$ are the coordinates of the camera plane and B, B' are constants. For the sake of shortening, the quadratic phase function is designated by the function Q, such that $Q(b)=\exp[i\pi b\lambda^{-1}(x^2+y^2)]$, where λ is the central wavelength of the light. L denotes the linear phase function, such that $L(\bar{s})=\exp[i2\pi\lambda^{-1}(s_x x+s_y y)]$, and $C(\bar{r}_s)$ is a complex constant dependent on the source point's location. The function $P(R_H)$ stands for the limiting aperture of the system, where it is assumed that the aperture is a clear disk of radius $R_H$ determined by the overlap area of the two interfering beams on the camera plane. The expression in the square brackets of Eq. (1) describes the transparency of the SLM. This transparency is a combination of a constant valued mask with a diffractive positive spherical lens of focal length $f_d$. In the past we presented two methods to display these two masks on the same SLM. The older, and less efficient, method is to randomly allocate half of the SLM pixels to each of the two masks. Lately the inventors have learned that a better way is by use of a positive lens mask over the whole SLM and light with two mutually orthogonal polarization components, one of which is parallel to the polarization of the SLM and the other which is orthogonal to it, so that the interference happens between the projections of each polarization component of the light beam on the crossing angle between the two orthogonal polarizations. The angle θ is one of the three angles used in the phase shift procedure in order to eliminate the bias term and the twin image from the final hologram. The asterisk in Eq. (1) denotes a two dimensional convolution. The explanation of Eq. (1) is as follows: the four left-most terms $\sqrt{I_s}C(\bar{r}_s)L(-\bar{r}_s/f_o)Q(1/f_o)$ describe the point source wave as is seen from the plane of lens L1. This wave is multiplied by the lens L1 [multiplied by $Q(-1/f_o)$], propagates a distance d [convolved with $Q(1/d)$] and meets the SLM where its transparency is in the square brackets of Eq. (1). Beyond the SLM there are two different beams propagating an additional distance $z_h$ till the camera [convolved with $Q(1/z_h)$]. On the camera detector, only the area of the beam overlap, denoted by the area of $P(R_H)$, is considered as part of the hologram. Finally, the magnitude of the interference is squared to yield the intensity distribution of the recoded hologram. It is easy to see from FIG. 1(a) and by calculating Eq. (1), that as long as the source point is located on the front focal plane of L1, the interference occurs between a plane and a spherical (in the paraxial approximation) wave.

Three holograms of the form of Eq. (1) with three different values of the angle θ are recorded and superposed in order to obtain a complex hologram of the object point, given by, $$H(\bar{p}) = C' I_s P(R_H) L\!\left(\dfrac{\bar{r}_s}{z_r}\right) Q\!\left(\dfrac{1}{z_r}\right), \quad (2)$$

where C' is a constant and $z_r$ is the reconstruction distance from the hologram plane to the image plane calculated to be, $$z_r = \pm |z_h - f_d|. \quad (3)$$

The ± indicates that there are twin possible reconstructed images although only one of them is chosen to be reconstructed, as desired. $\bar{r}_s$ is the transverse location of the reconstructed image point calculated to be, $$\bar{r}_r = (x_r, y_r) = \bar{r}_s \dfrac{z_h}{f_o}. \quad (4)$$

From Eq. (4) it is clear that the transverse magnification is $M_T = z_h / f_o$. The PSF of the system is obtained by reconstructing digitally the Fresnel hologram given in Eq. (2) at a distance $z_r$ from the hologram plane. The expression of the hologram in Eq. (2) contains a transparency of a positive lens with focal distance zr and hence, according to Fourier optics theory, the reconstructed image is, $$h_F(\bar{r}) = C' I_s v\!\left[\dfrac{1}{\lambda z_r}\right] F\!\left\{L\!\left(\dfrac{\bar{r}_r}{z_r}\right) P(R_H)\right\} \quad (5)$$
$$= C'' I_s \operatorname{Jinc}\!\left(\dfrac{2\pi R_H}{\lambda z_r} \sqrt{(x - M_T x_s)^2 + (y - M_T y_s)^2}\right),$$

where C'" is a constant, F denotes Fourier transform, v is the scaling operator such that $v[a]f(x)=f(ax)$, $\bar{r}=(x, y)$ are the coordinates of the reconstruction plane, Jinc is defined as $\operatorname{Jinc}(r)=J_1(r)/r$ and $J_1(r)$ is the Bessel function of the first kind, of order one.

Eq. (5) describes the two dimensional PSF of FINCH. Recalling that the object is a collection of infinitesimal incoherent light points which cannot interfere with each other, we realize that each independent object point is imaged to an image of the form of Eq. (5). The complete image of many object points is a convolution integral between the object denoted by intensity distribution $I_s(\bar{r})$ with the PSF shown in Eq. (5), as follows, $$I_i^L(\bar{r}) = I_s(\bar{r}) * h_F(\bar{r}). \quad (6)$$

Eq. (6) indicates that FINCH is a linear invariant system for the quantity of light intensity. However, since $h_F$ is in general a complex valued function, $I_i^L$ might be a complex valued function as well. This observation does not contradict any physical law because the reconstruction is done digitally by the numerical algorithm of the Fresnel back propagation. The superscript L is added to the intensity obtained by Eq. (6) in order to distinguish it from the non-linear reconstruction discussed next.

In case the hologram is reconstructed optically by illuminating the hologram with a coherent plane wave, the output intensity is $$I_i^N(\bar{r}) = |I_s(\bar{r}) * h_F(\bar{r})|^2. \quad (7)$$

$I_i^N$ denotes intensity of the optical reconstruction, or non-linear digital reconstruction as is demonstrated in the experimental part of this study. This image is not linear in relation to the gray levels of $I_s(\bar{r})$, but in some cases, for instance, binary objects whose images are not distorted by the non-linear operation, $I_i^N$ preferred over $I_i^L$ because the side lobes of $h_F$ are suppressed by the square operation, which results in improved image contrast.

The width of the PSF in every imaging system determines the resolution of the system. The width of the PSF is chosen herein as the diameter of the circle created by the first zero of the Jinc function of Eq. (5). This diameter remains the same for both the linear and non-linear reconstructions, and is equal to $1.22\lambda z_r/R_H$. According to Eq. (3), $z_r = |z_h - f_d|$ and therefore, based on a simple geometrical consideration, the radius of the hologram, which is the radius of the overlap area between the plane and the spherical beams, is, $$R_H = \begin{cases} R_o \frac{|z_h - f_d|}{f_d} & f_d \geq \frac{z_h}{2} \\ R_o & \text{Otherwise} \end{cases} \quad (8)$$

where $R_o$ is the radius of the smallest aperture in the system up to, and including, the SLM. For $f_d < z_h/2$ the projection of the spherical wave exceeds beyond the plane wave projection and therefore the radius of the overlap remains as $R_o$. Consequently, the width of the PSF for the regime of $f_d > z_h/2$ is $$\Delta = \frac{1.22\lambda z_r}{R_H} = \frac{1.22\lambda |z_h - f_d| f_d}{R_o |z_h - f_d|} = \frac{1.22\lambda f_d}{R_o}. \quad (9)$$

Figure 1:
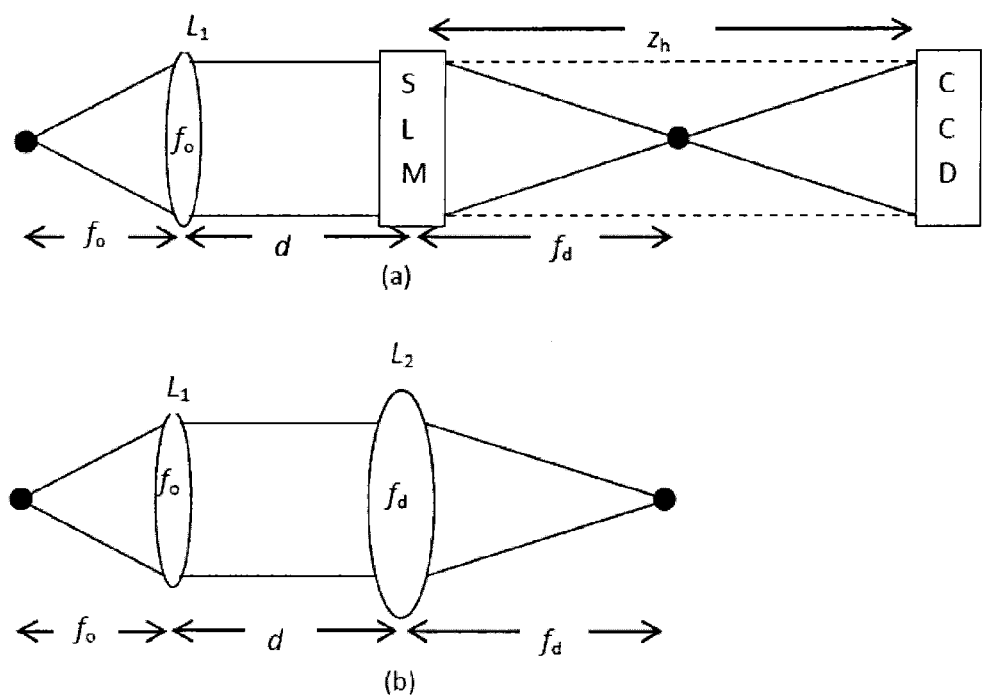
FIG. 1 shows comparisons of the optical configuration for (a) FINCH with only one diffractive lens and (b) A regular optical imaging system with the same parameters used in (a).

This PSF has exactly the size one would expect to see in the output of a regular imaging system shown in FIG. 1(b). At first glance, one might conclude that since the two systems have the same PSF, with the same width, their resolving power is the same. However Eq. (4) indicates that the location of the image point in the output plane of FINCH is at $\bar{r}_s z_h/f_o$. This is in general different than the location of the image point of the imaging system of FIG. 1(b), which is $\bar{r}_s f_d/f_o$. In other words, if the two systems observe the same two object points, the size of all the image points in the two systems is the same, but the gap between the two image points differs between the two compared systems. The two point gap of FINCH and of the regular imaging system differs by the ratio of $z_h/f_d$. Recalling that resolution is related to the gap between image points, as is manifested by the well known Rayleigh criterion, we realize that if $z_h/f_d > 1$, then FINCH can resolve better than a regular system. This is because in FINCH, the gap between every two image points is larger by a factor $z_h/f_d$ of compared to the two point gap of a regular imaging system with the same numerical aperture. Moreover, increasing the ratio $z_h/f_d$ in FINCH increases the resolution, where the maximum resolving power is achieved for the ratio $z_h/f_d = 2$. Beyond this limit the radius of the hologram is not increased further and keeps the maximum radius of $R_o$. That is again because the size of the spherical wave projection on the detector exceeds the plane wave projection, so the overlap area remains within the same circle with the radius of $R_o$.

To further investigate the properties of FINCH in comparison to a regular imaging system, one needs to equalize the size of both overall output images. Recall that the FINCH's overall image of many points is bigger by the factor $z_h/f_d > 1$, hence the output image with FINCH should be shrunk by this factor. So, when the FINCH image is shrunk by the factor of $z_h/f_d$ the overall image of both systems is the same and therefore can be compared on an equal basis. However, the result of shrinking the entire image causes the PSF size of FINCH to be narrower by the factor of $z_h/f_d$ in comparison to that of a regular imaging system.

Therefore, the effective width of the PSF of FINCH is $$\Delta_e = \begin{cases} \frac{1.22\lambda z_r f_d}{R_H z_h} = \frac{1.22\lambda f_d^2}{R_o z_h} & f_d \geq \frac{1}{2} z_h \\ \frac{1.22\lambda z_r f_d}{R_o z_h} = \frac{1.22\lambda f_d (1 - f_d / z_h)}{R_o} & 0 < f_d < \frac{1}{2} z_h \end{cases} \quad (10)$$

According to Eq. (10) the PSF width and consequently the resolution are dependent on the ratio $z_h/f_d$ for all values of $f_d$. Note that this dependence of the resolution to the ratio $z_h/f_d$ is different from the conclusion of previous studies (see Bouchal et al., cited above), where the authors there have claimed that above $z_h/f_d > 1$ the resolution is constant and is equal to that of a regular imaging system. The minimum width of the PSF is obtained for $z_h/f_d = 2$, and this width is $\lambda_e = 0.61 \cdot \lambda f_d / R_o$ (or $0.61 \cdot \lambda f_d / R_o$ in the object domain), which is half the width of the PSF of a regular imaging system [shown in FIG. 1(b)] with the same numerical aperture. The effective PSF of FINCH for the ratio $z_h/f_d = 2$ is now, $$h_F(\bar{r}) = C'' I_s Jinc\left(\frac{4\pi R_o}{\lambda f_d} \sqrt{(x - M_T x_s / 2)^2 + (y - M_T y_s / 2)^2}\right). \quad (11)$$

In terms of resolution, the improvement of FINCH in comparison to a regular incoherent microscope is more than a factor of 1 but somewhat less than a factor of 2 because the PSF of FINCH shown in Eq. (11) has the shape of that of a coherent system. To estimate the resolution improvement we recall that according to the Rayleigh criterion, two points are resolved if the dip between their images is more than approximately 27% of the maximum intensity. A simple numerical calculation indicates that in order to create a dip of not less that 27% between two functions of the form of Eq. (11), the minimal distance between them should be no less than $0.61 \cdot \lambda f_d/(1.4 \cdot R_o)$ and $0.61 \cdot \lambda f_d/(1.5 \cdot R_o)$ in cases of linear and non-linear reconstruction, respectively. Therefore the resolution improvement of FINCH over a regular incoherent microscope is about a factor of 1.4 and 1.5 for linear and non-linear reconstruction, respectively. The FINCH's resolution improvement over a coherent imaging system is a factor of 2.

According to Eq. (5), the PSF of FINCH is obtained as the scaled Fourier transform of the system aperture, exactly as is the case of a coherent imaging system. Therefore the shape of the MTF of FINCH is similar to the shape of the system aperture, i.e. a uniform clear disc shape. However the cut-off frequency of FINCH is different by the ratio of $z_h/f_d$ than that of a regular coherent imaging system, and can be twice as high in the optimal setup of $z_h/f_d=2$. Moreover, FINCH with the ratio $z_h/f_d=2$, has the same cut-off frequency as an incoherent imaging system, but unlike the later system, the MTF of FINCH is uniform over all the frequencies up to the cut-off frequency.

Figure 2:
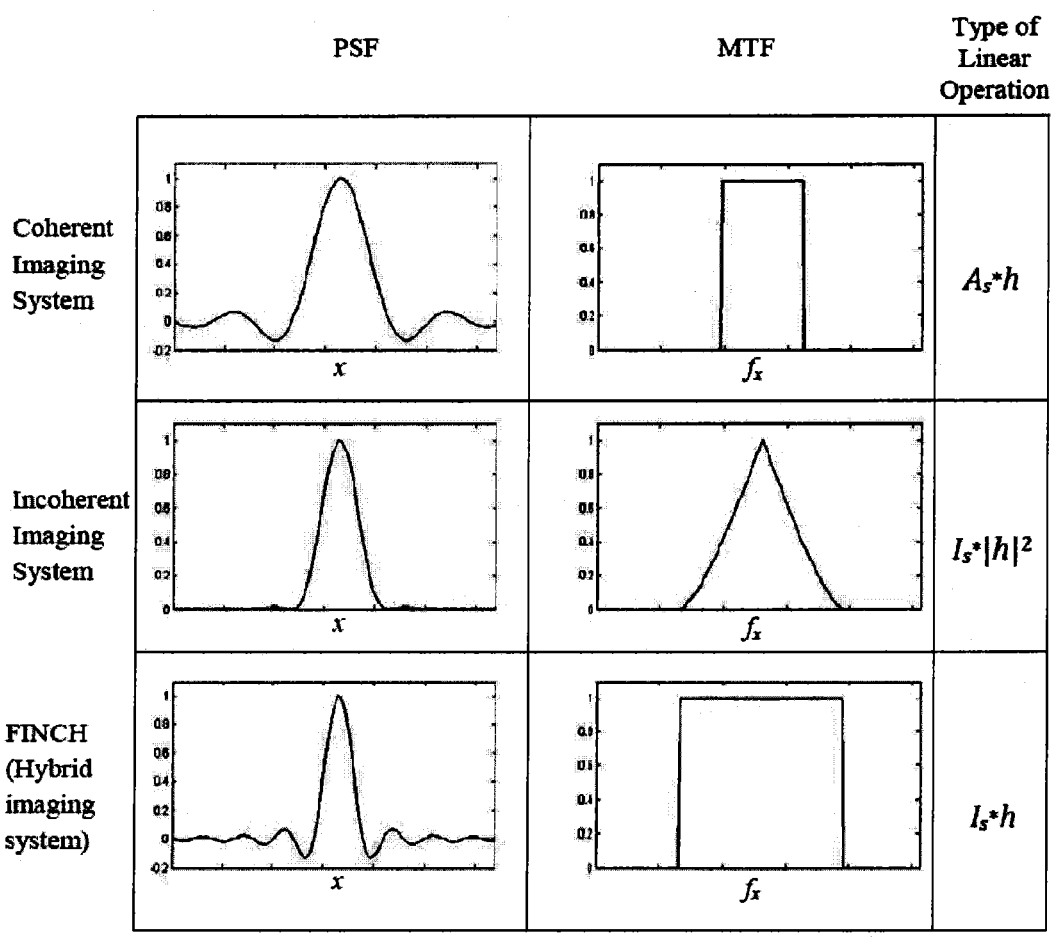
FIG. 2 shows a summary of the main features of the three linear systems discussed in the text. $A_s$ and $I_s$ stand for a complex amplitude and intensity of the input object, respectively. x and fx are the space and the spatial frequency coordinate, respectively.

The present inventors conclude that FINCH is superior in terms of resolution over both coherent and incoherent imaging systems. In fact, FINCH enjoys the best of both worlds; it has a cut-off frequency of an incoherent system with the same numerical aperture, and a uniform MTF like a coherent system. FIG. 2 summarizes the main properties of FINCH in comparison to either coherent or incoherent imaging systems. Looking at FIG. 2, one can conclude that, in addition to the two well known types of imaging systems, coherent and incoherent, there is a third type which can be denoted as a hybrid imaging system characterized by FINCH, since it associates incoherent recording with coherent reconstruction. The hybrid imaging system is linear in the intensity but its PSF is in general a complex valued function. Its MTF has the shape of the system aperture with a cut-off frequency that can be twice as large as that of a coherent imaging system with the same numerical aperture. In comparison to an incoherent system we see that both systems have the same bandwidth but FINCH does not attenuate the intensity of spatial frequencies greater than zero, as the incoherent imaging system does.

The superiority of FINCH in the resolution aspect is explained by the fact that the hologram of each object point is an interference result between two beams, both originated from this same point. The information about the point location is stored in the phase of both beams. During the wave interference, under the condition $z_h/f_d>1$, the two phases have the same sign and therefore they are summed such that the resulting linear phase function has a higher slope than in case of recording a coherent hologram with a non-informative reference beam. Therefore, as a result of the phase gaining, the image point location is farther from some arbitrary reference point than in the case of a regular imaging system, and therefore the image magnification is higher in FINCH. As the result, the separation between points is larger in FINCH and this feature is translated to better overall resolution. In the regime of $z_h/f_d<1$ the two summed phases have an opposite sign such that the resulting overall phase is de-magnified, the gap between various image points, and consequently the resolution, are smaller in comparison to a conventional imaging system with the same numerical aperture.

In this study we compare the transverse resolution of two 2D imaging systems; the conventional incoherent imaging system and FINCH. For both systems we analyzed the resolution at the front focal plane of the objective in which a comparison could be made because conventional incoherent imaging only resolves a single plane of focus. While FINCH can resolve multiple planes in an image, an analysis of FINCH resolution was limited to the front focal plane in this study for comparison purposes. In the future, theoretical and experimental analysis of the resolution properties of a more general FINCH, in which the location of the object is not limited to the front focal plane of the objective, should be very interesting and may offer additional opportunities for high resolution 3D imaging. Because FINCH utilizes an SLM it is possible to modify the diffractive lenses in the system and therefore to optimize the imaging resolution at different object planes.

All the above mentioned analysis is based on the assumption that FINCH is diffraction limited and the pixel size of the camera does not limit the system resolution. This assumption is fulfilled if the finest fringe of the hologram can be correctly sampled by the camera. Referring to FIG. 1(a) with the condition $z_h/f_d=2$, and recalling that the finest fringe is created by the interfered beams with the largest angle difference between them, the condition that should be satisfied is $$\tan\varphi = \frac{2R_o}{z_h} \leq \frac{\lambda}{2\delta}, \quad (12)$$

where $\varphi$ is the largest angle difference between the interfered beams in the system and $\delta$ is the camera pixel size. For a given SLM and digital camera, the only free variable is $z_h$. Therefore, in order to keep the system as diffraction limited as possible, the distance between the SLM and the camera should satisfy the condition $z_h>4R_o\delta/\lambda$. Increasing the distance $z_h$, while keeping the optimal condition $z_h/f_d=2$, narrows the field of view. Based on geometrical considerations, the radius R of the observed disk which can be recorded into the hologram is $R_v=2f_oR_o/z_h$.

Based on the discussion above, it is clear that the optimal ratio in sense of resolution between $z_h$ and $f_d$ is $z_h/f_d=2$. However this optimal ratio is obtained in the specific setup shown in FIG. 1(a) and the question is whether there is a more general configuration of FINCH in which the same resolution can be achieved. In the following subsection we answer this question.

[Alternative FINCH Configurations]

According to Eq. (10) the effective resolution of FINCH is $$\Delta_e = \frac{1.22\lambda z_r f_d}{R_H z_h}. \quad (13)$$

In order to improve resolution one should look for a configuration with higher $R_H$ and $z_h/f_d$ and with a $z_r$ that grows less than the other two factors. Such configuration might be the one shown in FIG. 3(a), in which the FINCH is generalized in the sense that the constant phase on the SLM is replaced with a negative lens with $f_2$ focal distance. When the various parameters are chosen such that there is a perfect overlap between the two spherical waves on the camera plane, $R_H$ and the ratio $z_h/f_d$ indeed become higher. The new $z_r$ is calculated from a similar equation to Eq. (1), in which in addition to the constant B there is a transfer function of a negative lens as the following, $$I_H(u,v) = \left| \sqrt{I_s}\, C(\bar{r}_s) L\!\left(\frac{-\bar{r}_s}{f_o}\right) Q\!\left(\frac{1}{f_o}\right) Q\!\left(\frac{-1}{f_o}\right) * Q\!\left(\frac{1}{d}\right) \times \left[ BQ\!\left(\frac{1}{f_2}\right) + \right. \right. \quad (14)$$

$$\left. \left. B'\exp(i\theta) Q\!\left(\frac{-1}{f_d}\right) \right] * Q\!\left(\frac{1}{z_h}\right) P(R_H) \right|^2.$$

$z_r$ calculated from Eq. (14) is $$z_r = \pm \left| \frac{(z_h - f_d)(z_h + f_2)}{f_d + f_2} \right|. \quad (15)$$

The transverse magnification remains $M_T=z_h/f_o$ as before. Next, we make use of the fact that the two spherical waves perfectly overlap on the camera plane, and based on simple geometrical considerations, the following two relations are obtained, $$R_H = R_o \frac{z_h - f_d}{f_d}, \quad (16)$$

$$\frac{z_h - f_d}{f_d} = \frac{z_h + f_2}{f_2}. \quad (17)$$

Substituting Eqs. (15)-(17) into Eq. (13) yields that effective width of FINCH's PSF in the general configuration is $$\Delta_e = \frac{0.61 \cdot \lambda f_d}{R_o}. \quad (18)$$

This is the same result obtained with the configuration of FIG. 1(a) for $z_h/f_d=2$. The conclusions are the following: 1) FINCH resolution in any configuration is limited by the value of $\Delta_e$ given in Eq. (18). This conclusion is expected since any configuration of FINCH does not enable any new information, or more spatial frequencies, to enter into the system, and therefore there is no reason for any further resolution improvement beyond the superior result given in Eq. (18). 2) The optimal configuration can be obtained in many forms as long as the overlap between the two different beams on the camera plane is perfect. This conclusion is true even if both diffractive lenses on the SLM are positive, where one is focused before the camera and the other beyond it, as is shown in FIG. 3(b). In that case the $z_r$ is calculated by the same method to be $$z_r = \pm \left| \frac{(z_h - f_d)(z_h + f_2)}{f_d + f_2} \right|, \quad (19)$$

and the radius of the hologram under the perfect overlap condition is the same as is given in Eq. (16), where the following relation also exists:

$$\frac{f_2 - z_h}{f_2} = \frac{z_h - f_d}{f_d}. \quad (20)$$

Substituting Eqs. (16), (19), (20) into Eq. (13) yields again the same effective resolution as is given in Eq. (18). Here again the optimal resolution can be achieved. Note that displaying two different diffractive lenses on randomly distributed pixels of the same SLM could result in reduced efficiency from both lenses, because only half of the SLM pixels are available for each lens (J. Rosen, and G. Brooker, "Fluorescence incoherent color holography," Opt. Express 15, 2244-2250 (2007); J. Rosen, and G. Brooker, "Non-scanning motionless fluorescence three-dimensional holographic microscopy," Nat. Photonics 2, 190-195 (2008)). Therefore a glass spherical lens should be added to the system which together with the SLM (on which the pattern of a sum of constant and quadratic phase functions are displayed) creates an equivalent system of FIG. 3(b). This system is depicted in FIG. 3(c). The purpose of the additional glass lens is to convert the plane wave, reflected from the SLM, into a converging spherical wave which interferes with the other spherical wave in order to create the hologram.

[Experimental Methods]

The purpose of these experiments was to test the theoretical predictions. Specifically, we wanted to determine the relationship between $z_h/f_d$ and FINCH resolution and to compare the resolution of FINCH microscopy at optimal $z_h/f_i$ to that of optical microscopy. Implementing FINCH holography in a microscope (FINCHSCOPE) only requires that the fluorescence microscope be changed in the way fluorescence emission is detected. The infinity beam of the sample imaged with a microscope objective is directed to an SLM and is split into two beams which interfere at a camera to create a hologram. The microscope configuration schematically shown in FIG. 4 used for these experiments was built upon our laboratory's previous concepts and designs for implementing FINCH in a microscope with some important additions and modifications. In the experiments presented here, the identical smallest features on the highest resolution USAF chart were imaged at the plane of focus by three methods and compared; 1) conventional high resolution fluorescence microscopy with all glass optics including a matched and properly configured microscope tube lens, 2) microscopy which utilized the SLM as a tube lens to focus the image upon the camera and 3) holograms captured with FINCH and reconstructed at the best plane of focus.

In order to simplify analysis and be able to compare image resolution between conventional fluorescence microscopy (which only resolves a single focal plane) and FINCH, a USAF negative test slide (Max Levy Autograph) with a single plane of focus that contained group 9 features as small as 645 lp/mm (0.78 µm feature size) was used and was much smaller than the smallest features used previously. The slide was placed upon a fluorescent plastic slide (Chroma) so that the negative features were fluorescent. A No. 1 coverslip was placed on the slide with microscope immersion oil between the coverslip and the test slide. There was an air interface between the objective and the top of the coverslip. The USAF pattern was adjusted to the plane of focus of the objective and kept in that position for all of the imaging experiments.

An important difference in the configuration from previous designs is that the SLM was positioned at a 45° angle and the system was designed for ready switching between ocular or camera viewing of the sample fluorescence and holography without disturbing the position or focus of the sample. This new microscope configuration was constructed on the stand of an upright Zeiss Axiophot fluorescence microscope. The binocular head with camera port and tube lens of the microscope was removed and the components needed for FINCH holography and viewing of the sample were attached to the microscope in its place. The remaining components of the microscope were not altered. An AttoArc 100 watt mercury arc lamp was used as the excitation source and the excitation was controlled by an electronic shutter. In these experiments, an air Nikon Plan Apo 20×, 0.75 NA objective was used. The epifluorescence dichroic and excitation filter were Semrock Cy3 filters, and the emission filters were a 570 nm center λ, 10 nm bandpass filter (Thorlabs) for the FINCH images and the images taken with the SLM as a tube lens. A Semrock Cy3 emission filter was used for the glass tube lens ocular viewing and camera images. In experiments not shown, as expected, the resolving power of the objective-tube lens combination was confirmed to be the same with the Cy3 emission filter as with the 10 nm bandpass filter. This is because the Nikon Plan Apo objective—tube lens combination is achromatic. A major improvement in light transmission was achieved by placing the SLM at a 45° angle and eliminating the beam splitting cube used in previous work (G. Brooker, N. Siegel, V. Wang and J. Rosen, "Optimal resolution in Fresnel incoherent correlation holographic fluorescence microscopy," Opt. Express 19, 5047-5062 (2011)). Careful alignment of the SLM (Holoeye HEO 1080P, 1080×1920 pixels, 8 um pixel pitch, phase only) in all directions was essential to prevent any image degradation. Furthermore the SLM firmware was modified to give a 2π phase shift over its range at a 45° angle and the Fresnel patterns displayed on the SLM were adjusted for the 45° angle. Input and output polarizers were rotated 45° along the optical axis for improved resolution, so that all the pixels on the SLM were utilized to create the two interfering wavefronts. The 8 meter physical curvature of the SLM substrate was accounted for in the lens parameters used to generate the desired focal lengths created by the diffractive Fresnel lens patterns that were displayed on the SLM. A multi-axis micrometer controlled mount was constructed so that the SLM could be adjusted to be precisely centered on the optical axis and so that there was no rotational misalignment of the SLM about the optical axis. A calibrated iris was attached to the back aperture of the objective so that the back aperture could be varied from 3 mm to 12 mm to reduce the resolution of the objective so that FINCH imaging could be directly compared to optical microscopy at different effective objective NAs. Removal of the iris enabled imaging with the full 16 mm back aperture of the objective. In order to compare imaging performance between regular microscopy with that of FINCH, the microscope was configured so that a precision mirror on a rollerball bearing slider could be inserted into the emission beam path without disturbing the location or focus of the sample or the setting of the back aperture of the objective. Once the mirror was in place, the emission light was simultaneously directed through a Nikon tube lens and beam splitting cube to another of the same model camera that was used for holography. Furthermore, an ocular positioned on the beam splitting cube allowed direct viewing of the sample under observation. Both the ocular and both cameras were aligned and positioned to be precisely parfocal (all at the same focus) under imaging conditions at the correct focus position between the objective and sample. An in focus image on the camera used for holography was obtained when the focal length of the diffractive lens pattern displayed on the SLM was equivalent to the distance between the SLM and camera. The two CCD cameras were QImaging Retiga 4000R, cooled 2048×2048 pixel, 7.4 μm pixel pitch, 12 bit.

The operation of the microscope was controlled by software written in LabView. Three phase shifted holograms were taken for each FINCH image and calculated.

[Experimental Results]

The ability of the camera to resolve the fine fringes of the hologram has a significant effect on the ability of FINCH to resolve small objects. Because of this, we moved the camera away from the SLM until we reached a $z_h$ position of 1380 mm at which we were able to resolve the smallest features in the USAF pattern using FINCH with $z_h/f_d=2$. The size of the acquired hologram is equal to the size of the diffractive Fresnel lens displayed on the SLM. As shown in the left panel of FIG. 5, the microscope image of the small features in groups 8 and 9 (shown in the red box) under standard imaging conditions with a tube lens and with a 5 mm aperture over the back of the objective lens, was quite small and needed to be zoomed in to see them as shown in the middle image of FIG. 5, while the FINCH images needed to be zoomed and cropped much less due to the magnification imposed by the long SLM-CCD distance. As can be seen, the small features were not well resolved by regular microscopy, however imaging with FINCH clearly resolved the small features as shown in the right panel of FIG. 5.

The USAF resolution target used in these experiments contains the smallest features available. In order to compare FINCH resolution in a very controlled manner to standard microscopic imaging, we imaged this target with the Nikon 20× 0.75 NA objective which had a 16 mm back aperture. We then installed a calibrated iris (Thorlabs) on the back aperture of the objective and systematically reduced the aperture from 12 mm to 3 mm. At each reduction in the back aperture, we took standard microscope images, images using the SLM as the tube lens and FINCH holographic images which were reconstructed as either linear or non-linear images as described above. Results from using 3, 5, 8 and 16 mm (no iris) back apertures are shown in FIG. 6.

Additional apertures of 4, 6, 10 and 12 mm were used with results intermediate to the images shown here. An analysis of this experiment is shown in FIG. 7. The plot of FIG. 7 shows the visibility in the smallest group of lines versus the diameter of the back aperture, where the visibility defined as $(I_{min}-I_{max})/(I_{max}+I_{min})$ is a standard quantity used to characterize resolution. In this work, we examined visibility of the horizontal features in group 9, element 3, i.e. the smallest features. To define $I_{max}$, we located the row of pixels in each of the three features that had the highest summed intensity. We then averaged all the pixel values from those rows. To define $I_{min}$, we located the row of pixels in each of the gaps between the features that had the lowest summed intensity, and then averaged the pixel values from those rows. Visual inspection of the images and the visibility calculations demonstrate that FINCH images resolve the smallest features better than images from the comparable standard microscope configuration at all effective NAs of the objective. Using the SLM as a tube lens produced images which had similar resolution to the glass tube lens up to an aperture of 8 mm, the approximate minimum size of the aperture of the SLM when viewed at a 45° angle in our setup.

We then investigated the relationship between resolution and $z_h/f_d$, which we call z-ratio, using a reduced aperture of 5 mm since this dramatically reduced the imaging resolution of the objective under normal microscope conditions. Images at varying z-ratios from 0.85 to 2.4 were recorded and are shown in FIGS. 8 and 9. Visual inspection of the images shows that the resolution continues to improve as z-ratio increases from 0.85 and reaches a peak around z-ratio=1.8±0.2. Visibility data is presented in FIG. 10. The maximum is not exactly at $z_h/f_d=2$ because the SLM has inherent spherical-like curvature which introduces an effective positive spherical lens of about 8 meter focal length. In other words, instead of a system of the type shown in FIG. 1(a) in which the maximum resolution is obtained at $z_h/f_d=2$, effectively there is a system of the type shown in FIG. 3(c) in which there is an additional lens in the system (the inherent 8 meter curvature of the SLM) and the maximum resolution is obtained at about $z_h/f_d=1.8$. Note that although the focal length of the diffractive lens displayed on the SLM is corrected to account for the inherent curvature of the SLM, the constant phase mask cannot be corrected, and therefore the model shown in FIG. 3(*c*) is valid here. This system behavior is in contrast to the report by other investigators that there was no change in resolution between z-ratio of 1 and 2. Note that at z-ratio=0.85 the visibility in the smallest group of lines is zero and therefore this point of data is not included in the plot of FIG. 10. However this result fits the prediction that the resolution of FINCH for z-ratio<1 is lower than that of a regular microscope; as seen in FIG. 7, the visibility of the smallest group of lines, with objective back aperture of 5 mm, is 0.1.

[Perfect Overlap Requirements for FINCH]

Increased FINCH efficiency can be accomplished by interfering two spherical waves to reduce the optical path differences, yet maintain complete overlap between the two waves. Under these conditions the camera can be placed quite close to the SLM. This dramatically reduces exposure time, reduces noise and creates much higher quality images. Perfect overlap between two spherical beams originating from each image point (reference and sample) creates the most efficient incoherent hologram and best images.

To ensure perfect overlap of sample and reference beams and therefore optimal holograms of all points in the object, each pair of sample and reference beams must be concentric. This can be achieved in the following ways:

1. Telecentric arrangement of tube lens.
   a. Place a tube lens at a distance away from the objective that is equal to the tube lens focal length plus the microscope objective focal length.
   b. Split the beam from the tube lens into two arms, the F3 arm and the F4 arm.
   c. Into each arm place relay lenses in a 4f configuration with unit magnification. The focal length of the lens in the F3 arm must be different from the focal length of the lens in the F4 arm.
   d. Recombine the arms into a single beam path.
   e. This can be achieved in a Michelson or Mach-Zehnder interferometer arrangement.
2. Bring the hologram forming lens/assembly/SLM optically into contact with the microscope objective. For example, with reference to FIG. 3, set d=0. If d is not zero but is less than 20 mm, the sample and reference beams will be nearly concentric and have almost perfect overlap.

FIG. 11 shows another FINCH configuration which can create a perfect overlap between reference and sample beams that yields high holographic efficiency. This configuration is also telecentric so that the two different focal lengths used to create the two beams needed for interference are coincident over the complete field of view. This occurs because the tube lens fg is positioned fg distance from the back focal length of the microscope objective lens and makes the system telecentric. The optical distance relationships for this configuration are as follows:

$fg = Z1 + 2Z2 + Z3$ $fg = Z1 + 2Z4 + Z5$ $2f3 + Z2 = 2f4 + Z4$ $f3 \neq f4$

Z1 is a distance from the center of the beam splitting cube to the center of the tube lens; Z2 is a distance from the center of the beam splitting cube to the end of a focal length f3 of the first lens; Z3 is a distance from the center of the beam splitting cube to the focus of the light emitted from the first lens in the direction of the beam splitting cube (the portion of light emitted from the first lens is also known as the "F3 arm" in FIG. 11); Z4 is a distance from the center of the beam splitting cube to the end of a focal length f4 of the second lens; Z5 is a distance from the center of the beam splitting cube to the focus of the light emitted from the second lens in the direction of the beam splitting cube (the portion of light emitted from the second lens is also known as the "F4 arm" in FIG. 11).

The "Z" distances are adjusted according to the equations to create telecentricity and to ensure perfect interference between the Z3 and Z4 arms of the interferometer. The mirrors in each arm create a "4f" imaging condition causing the image to pass twice through either the f3 or f4 lenses. The piezo device in one arm (shown in the F4 arm) is used to alter the optical path length in one arm of the interferometer to change the phase in either the reference or sample beam path. During image capture, the phase is changed for example by 2π/3 three times to obtain the three phase-shifted images which create the complex hologram used for further processing. The conditions for best interference require that the optical distances of both arms of the interferometer be equal. The CCD or CMOS camera is placed at the hologram plane. The lenses f3 and f4 are selected to be high quality imaging lenses such as achromats or composite lenses selected for their high quality imaging resolution.

Figure 3:
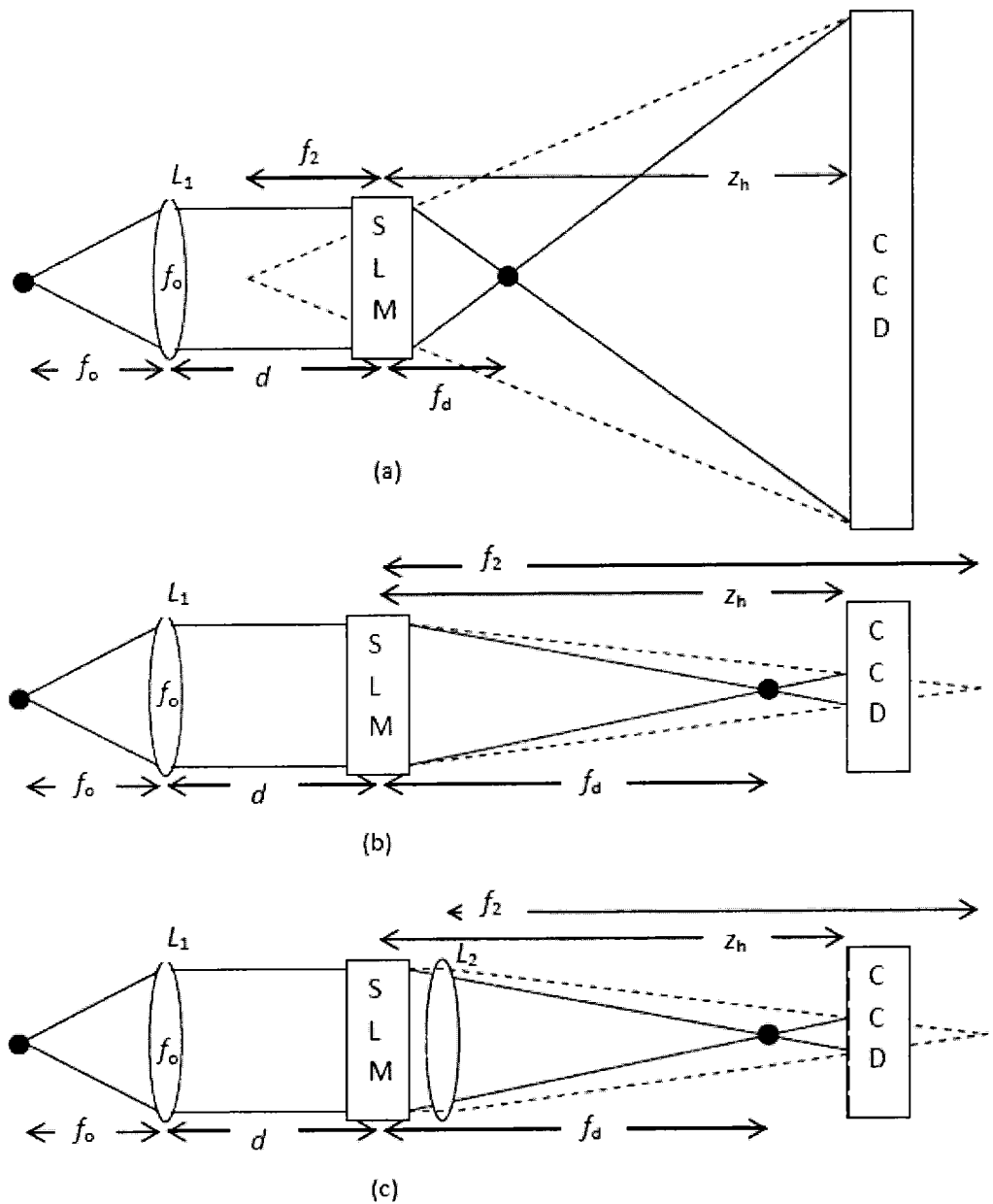
FIG. 3 shows (a) FINCH with two diffractive lenses, one is positive and the other is negative; (b) FINCH with two diffractive lenses, both are positive; and (c) a practical setup that emulates the setup of (b), with one positive diffractive lens displayed on the SLM and one positive glass lens placed near to the SLM.
Figure 4:
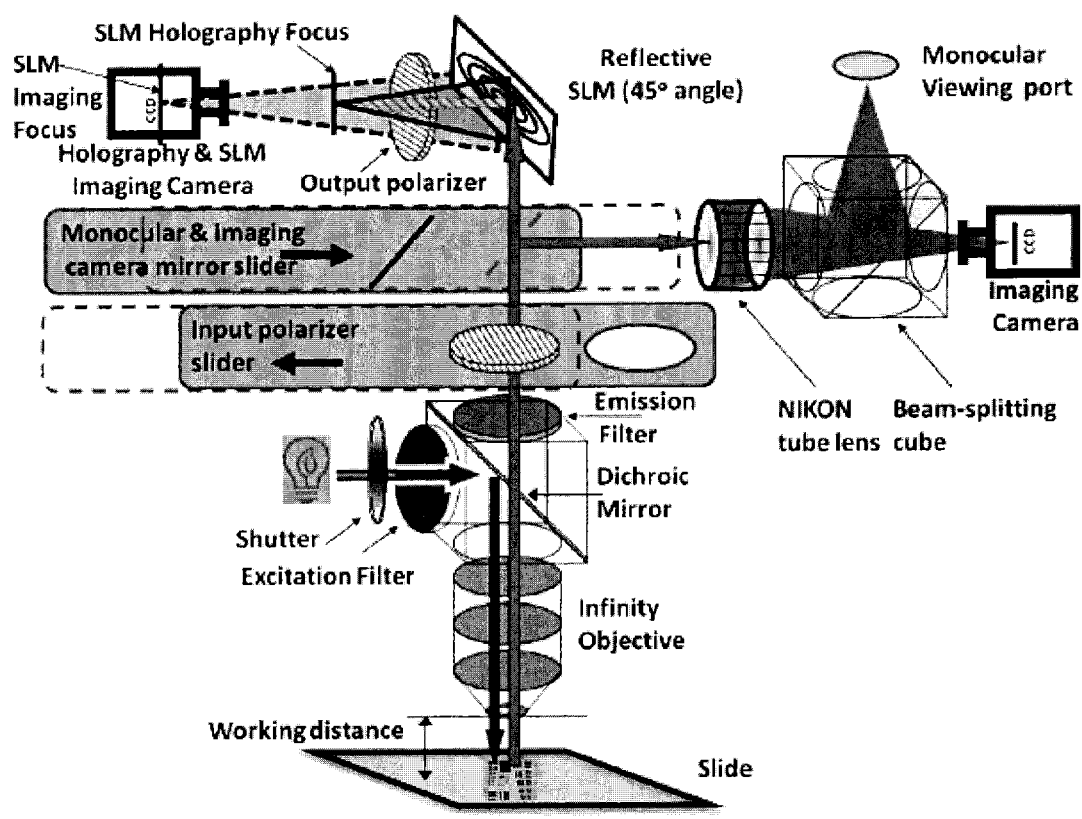
FIG. 4 shows a schematic representation of the microscope for comparison of FINCH to standard fluorescence microscopy on the same identical sample without change in position or focus. The position of the two sliders and the diffractive lens pattern displayed on the SLM determines the imaging mode selected. The position of the sliders is shown for FINCH. In this configuration the increased efficiency for the separation of the reference and sample beams is accomplished by capitalizing on the polarization properties of the SLM. Input and output polarizers were rotated 45° along the optical axis to separate the reference and sample beams so that all the pixels on the SLM were utilized to create the two interfering wavefronts.

In the embodiments shown in FIGS. 3 and 4, the purpose of the SLM is to separate the two beams and to change the phase on one of the beams. Changing the phase in the configuration of FIG. 11 is done by moving the piezo device three times to create a 2π change for the three holograms which are normally captured. Also in that configuration the phase change could be accomplished with a SLM or liquid crystal device or by any other means for changing the phase of a light beam.

The ultimate test of the super-resolving capabilities of an optical system to resolve beyond established optical limits is the ability to image objects which are smaller than can be resolved by classical optical imaging systems. In that regard, 100 nm fluorescent beads are well beyond the limits which can be resolved by optical means. According to the Abbe criteria (0.5λ/NA), with a 100×1.4 NA objective, the optical resolution limit at 590 nm would be 0.5×590 nm/1.4=211 nm. FINCH resolves better than the Abbe limit wherein a 100 nm bead measured 130 nm as shown in FIG. 12.

CONCLUSIONS

The present specification shows an analysis of FINCH with the tools of the linear system theory. The theoretical conclusions are supported well by experiments described herein. Applicants conclude that FINCH is a hybrid system in the sense that its MTF has the shape of a coherent imaging system but in the optimal conditions, its spatial bandwidth is equal to that of an incoherent system. The width of the PSF of FINCH, and accordingly its resolution, is dependent on its configuration and on the ratio between the distance from the SLM to the camera and the focal length of the diffractive lens. In all the possible configurations, the condition to obtain maximum resolution occurs when there is a perfect overlap between the projections of the two different interfering beams (originating from the same point source) on the camera sensing plane. Under the optimal condition described above, FINCH can resolve better than a regular glass-lenses-based imaging system with the same numerical aperture. In terms of Rayleigh criterion the improvement is between 1.5 and 2 fold in comparison to incoherent and coherent systems, respectively.

What is claimed is:

1. An apparatus for producing a hologram, comprising:
a collimation lens configured to receive incoherent light emitted from an object;
a spatial light modulator (SLM) that includes at least one diffractive lens which is configured to receive the incoherent light from the collimation lens and split the incoherent light into two beams that interfere with each other, wherein the SLM and the collimation lens are separate optical devices; and
a camera configured to record the interference pattern of the two beams to create a hologram,
wherein a ratio between a distance from the SLM to the camera and a focal length of the diffractive lens is greater than 1.5 and less than or equal to 2.

2. The apparatus according to claim 1, wherein the SLM includes at least two diffractive lenses.

3. The apparatus according to claim 2, wherein the at least two diffractive lenses includes a positive diffractive lens and a negative diffractive lens.

4. The apparatus according to claim 2, wherein the at least two diffractive lenses includes a first positive diffractive lens that focuses light onto a point in front of the digital camera and a second positive diffractive lens that focuses light onto a point beyond the digital camera.

5. The apparatus according to claim 2, further comprising a glass spherical lens configured to convert a spherical wave reflected from the SLM, into a converging spherical wave which interferes with another spherical wave in order to create the hologram.

6. The apparatus according to claim 1, wherein the SLM is configured at an angle of 45 degrees with respect to the object.

7. The apparatus according to claim 1, wherein the SLM is transmissive in-line in the optical path with respect to the object.

8. The apparatus according to claim 1, wherein the distance from the collimation lens to the SLM is zero.

9. The apparatus according to claim 1, wherein the distance from the collimation lens to the SLM is less than 20 mm.

10. The system according to claim 1, further comprising two different polarizers in the path of light emitted from the object, wherein the function of the polarizers is to separate the passage of reference and sample interfering beams based on the polarization properties of the SLM.

11. An apparatus for producing a hologram, comprising:
a tube lens configured to receive light emitted from an object
a first mirror;
a second mirror;
a beam splitting cube configured to receive light emitted from the object via the tube lens and to split the light in two directions towards the first mirror and the second mirror;
a first lens positioned in the pathway between the beam splitting cube and the first mirror;
a second lens position in the pathway between the beam splitting cube and the second mirror; and
a hologram plane configured to receive light emitted from the beam splitting cube after it is reflected off the first mirror and the second mirror to produce a hologram, the beam splitting cube being disposed between the hologram plane and each of the first mirror and second mirror with respect to the light that is reflected by the beam splitting cube towards the hologram plane,
further comprising a microscope objective lens having a back focal length, wherein a distance from a center of the tube lens to an end of the back focal length of the microscope objective lens is $f_g$ which is predetermined according to the following:

$$f_g = Z_1 + 2Z_2 + Z_3$$

$$f_g = Z + 2Z_4 + Z_5$$

$$2f_3 \pm Z_2 = 2f_4 \pm Z_4$$

$$f_3 \neq f_4$$

where $Z_1$ is a distance from the center of the beam splitting cube to the center of the tube lens; $Z_2$ is a distance from the center of the beam splitting cube to the end of a focal length $f_3$ of the first lens; $Z_3$ is a distance from the center of the beam splitting cube to the focus of the light emitted from the first lens in the direction of the beam splitting cube; $Z_4$ is a distance from the center of the beam splitting cube to the end of a focal length $f_4$ of the second lens; $Z_5$ is a distance from the center of the beam splitting cube to the focus of the light emitted from the second lens in the direction of the beam splitting cube.

12. The apparatus according to claim 11, further comprising a camera placed at the hologram plane and configured to record the hologram.

13. The apparatus according to claim 11, further comprising a piezo device configured to move the second mirror, wherein the piezo device is configured to move three times to obtain the three phase-shifted holograms which have an overall $2\pi$ phase change, the three phase-shifted holograms being used to create a complex hologram.

* * * * *